United States Patent [19]

Snow

[11] 4,129,430

[45] Dec. 12, 1978

[54] FILTER ASSEMBLY

[76] Inventor: Charles L. Snow, 4900 Spring Grove Ave., Cincinnati, Ohio 45232

[21] Appl. No.: 786,341

[22] Filed: Apr. 11, 1977

[51] Int. Cl.² ............................................. B01D 46/00
[52] U.S. Cl. ....................................... 55/485; 55/487; 55/501; 55/511; 55/528; 55/DIG. 31
[58] Field of Search ................. 55/124, 126, 131, 155, 55/482, 485, 486–488, 491, 501, 511, 514, 524, 527, 528, DIG. 31; 160/380

[56] References Cited

U.S. PATENT DOCUMENTS

| 2,220,127 | 11/1940 | Slayter | 55/511 |
| 2,795,290 | 6/1957 | Butsch et al. | 55/524 |
| 2,954,786 | 10/1960 | Lebert | 55/482 |
| 3,175,603 | 3/1965 | Tonnon | 160/380 |
| 3,877,909 | 4/1975 | Hansen | 55/528 |

*Primary Examiner*—Bernard Nozick
*Attorney, Agent, or Firm*—James W. Pearce; Roy F. Schaeperklaus

[57] ABSTRACT

A filter assembly which includes spaced first stage resin bound fibrous filter members with a second stage fine filter member spaced between the first stage members to form plenum chambers on opposite sides of the second stage member with the first stage members being dimensionally stable and supporting and protecting the second stage filter member.

1 Claim, 4 Drawing Figures

FILTER ASSEMBLY

This invention relates to air filters. More particularly, this invention relates to an air filter assembly which includes a plurality of stages.

An object of this invention is to provide a filter assembly which includes a first stage rough filter element and a second stage finer element.

A further object of this invention is to provide such a filter assembly in which there is a plenum space or chamber between the filter stages.

A further object of this invention is to provide such a filter assembly in which the first stage is dimensionally stable and supports and surrounds the second stage.

Briefly, this invention provides a filter assembly which includes an outer flat first stage rough filter member. The first stage filter member includes a resin binder to render the first stage filter member dimensionally stable. A second stage filter member of find denier is mounted inside the first stage filter member with a plenum chamber being formed between the first and second stages.

The above and other objects and features of the invention will be apparent to those skilled in the art to which this invention pertains from the following detailed description and the drawings, in which.

In the following detailed description and the drawings, like reference characters indicate like parts.

Figure 1:
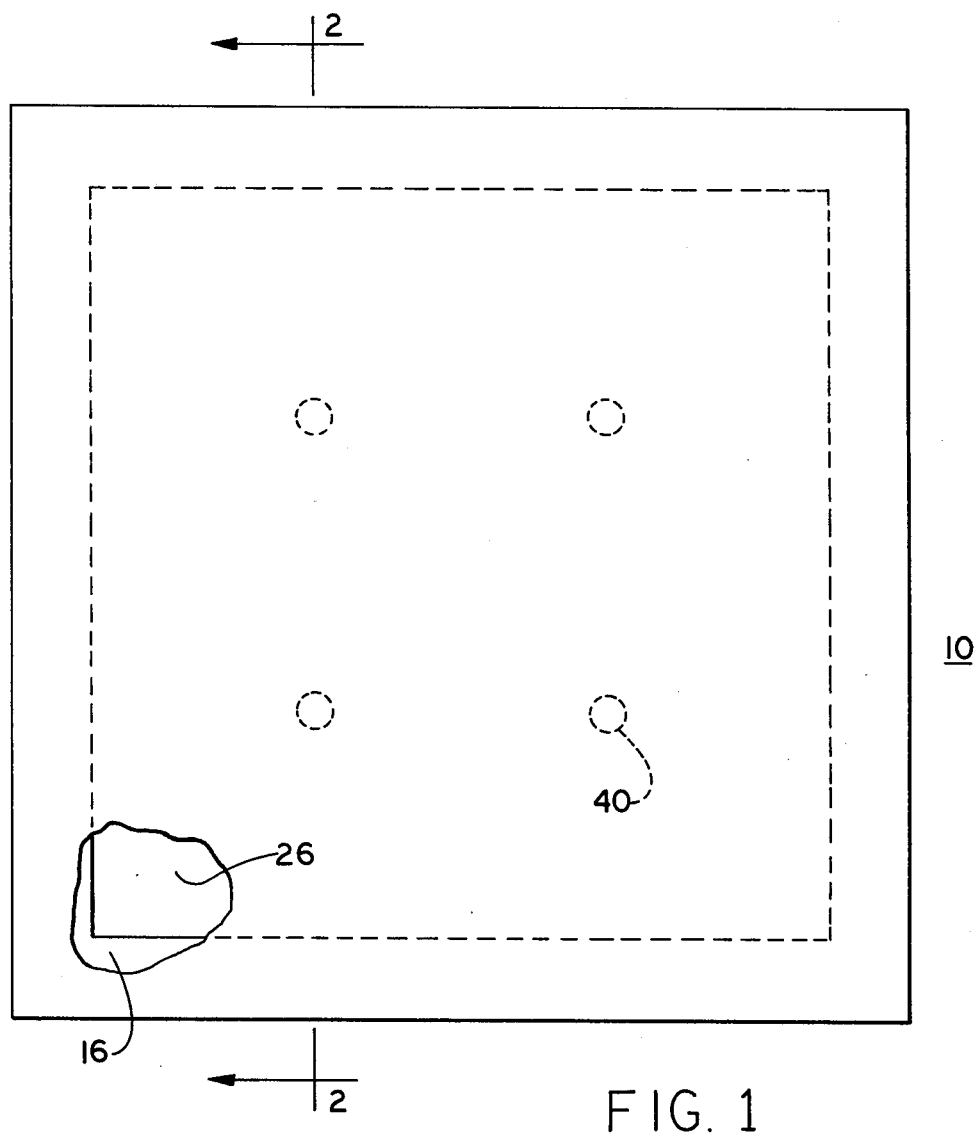
FIG. 1 is a plan view of a filter assembly constructed in accordance with an embodiment of this invention partly broken away to reveal interior construction.
Figure 2:
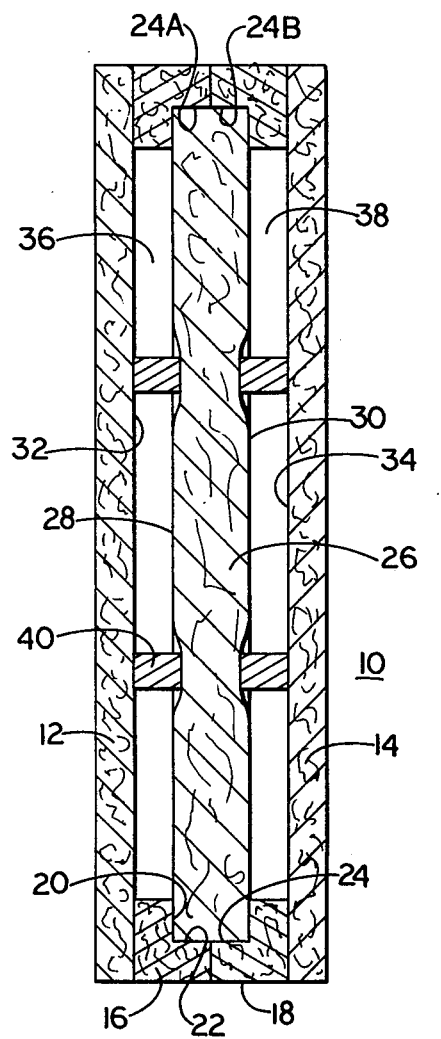
FIG. 2 is a view in section taken on the line 2—2 in FIG. 1.

In FIGS. 1 and 2 is shown a filter assembly 10 constructed in accordance with an embodiment of this invention. The filter assembly 10 includes flat fibrous outer first stage filter members or pads 12 and 14. The outer first stage filter members can be formed of resin bound polyester fibrous material of the type known as Westex Fil-11, a trademark of Western Acadia Inc. This material is a light weight open material which has good dimensional stability. Hollow frame or ring members 16 and 18 are mounted between the outer first stage members 12 and 14 to hold the members 12 and 14 in spaced parallel relation. The members 16 and 18 can be formed of the same material as the members 12 and 14.

Figure 3:
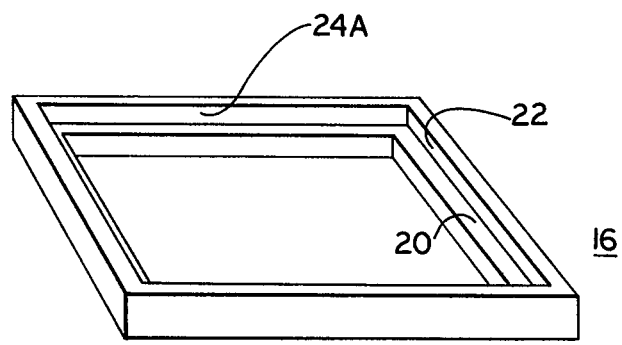
FIG. 3 is a perspective view of a hollow spacer frame element of the filter assembly.

The members 16 and 18 are of similar construction. As shown in FIGS. 2 and 3, the member 16 can be of angle shape in cross section and includes a shoulder 20 and walls 22 at right angles to the shoulder 20. An inwardly directed groove 24 (FIG. 2) is formed between the members 16 and 18 with portions 24A and 24B of the groove being formed in the members 16 and 18, respectively. An inner second stage flat fibrous filter member or pad 26 is mounted in the groove 24 with walls 28 and 30 of the second stage filter member 26 spaced from and substantially parallel to inner walls 32 and 34 of the first stage filter members 12 and 14, respectively, to form plenum chambers 36 and 38 on opposite sides of the second stage filter member 26. Spacer elements 40 can be adhesively attached to the first stage filter members 12 and 14 and can engage the second stage filter member 26 to hold the second filter member 26 in position. The spacer elements 40 can be of the same material as the members 12 and 14. The frame members 16 and 18 and the outer first stage filter members 12 and 14 can be adhesively attached together.

The second stage filter member can be formed of fine fibrous material such as 2 to 4 denier polypropylene fibers and can form a highly efficient filter which removes particles which pass through one of the first stage filter members.

The outer first stage filter members 12 and 14 and the hollow frame members 16 and 18 form a dimensionally stable self-supporting framework for the filter assembly, and the second stage filter member is surrounded and protected thereby without need for stiffening ribs or frames.

As air is passed through the filter assembly, one of the first stage filter members can remove coarse particles therefrom. The second stage filter member can be highly efficient and can remove the smaller particles which can pass through one of the first stage filter members. Thus, the filter assembly can have the high efficiency of the second stage filter member and also the large capacity of the first stage filter members.

The plenum spaces act as expansion chambers causing a reduction in air velocity as the air approaches the second stage filter member and permitting the air to spread over the face of the second stage filter member as the air approaches the second stage filter member.

Figure 4:
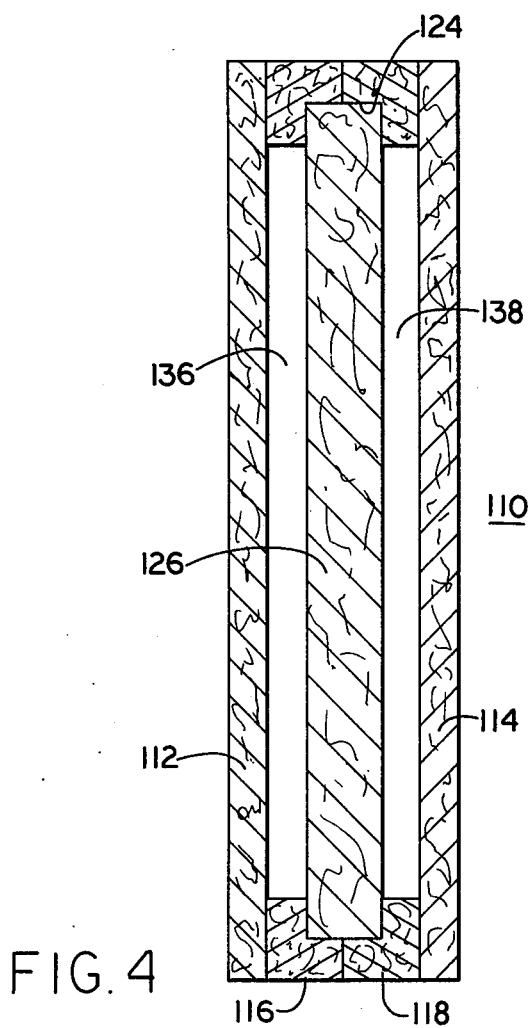
FIG. 4 is a view in section of a filter assembly constructed in accordance with another embodiment of this invention.

In FIG. 4 is shown a filter assembly 110 which is generally similar to that shown in FIGS. 1–3 inclusive and includes flat fibrous first stage filter members 112 and 114 and hollow frame members 116 and 118. A flat fibrous second stage filter member 126 is mounted in a groove 124 formed between the frame members 116 and 118 with plenum chambers 136 and 138 on opposite sides of the second stage filter member 126. The assembly 110 differs from the assembly 10 in the omission of the spacer members, which can be omitted if the second stage filter member does not require support of spacer members.

The filter assemblies illustrated in the drawings and described above are subject to structural modification without departing from the spirit and scope of the appended claims.

Having described my invention, what I claim as new and desire to secure by letters patent is:

1. A filter assembly which comprises a pair of flat fibrous dimensionally stable resin-impregnated first stage filter members, means for supporting the first stage filter members in spaced parallel relation, means for supporting a flat fibrous second stage filter member in parallel relation with and between the first stage filter members, means surrounding the second stage filter member and forming plenum chambers between the second stage filter member and the first stage members, the means supporting the first stage filter members in spaced relation including a pair of ring members defining a frame, there being an inwardly directed groove in the frame an outer edge portion of the second stage filter member being mounted in the groove, edge portions of the first stage filter members bearing on the sides of the frame and a plurality of spacer members between sides of the second stage filter member and opposed sides of the first stage filter members to hold the second stage filter member in spaced relation to the first stage filter members, the spacer members and the ring members holding the second stage filter member spaced from the first stage filter members.

* * * * *